US012272903B2

(12) United States Patent
Bertsch

(10) Patent No.: US 12,272,903 B2
(45) Date of Patent: Apr. 8, 2025

(54) ROTARY DEVICE FOR PLUG CONNECTORS

(71) Applicant: Amphenol Tuchel Industrial GmbH, Heilbronn (DE)

(72) Inventor: Michael Bertsch, Heilbronn (DE)

(73) Assignee: AMPHENOL TUCHEL INDUSTRIAL GMBH, Heilbronn (DE)

( * ) Notice: Subject to any disclaimer, the term of this patent is extended or adjusted under 35 U.S.C. 154(b) by 587 days.

(21) Appl. No.: 17/626,411

(22) PCT Filed: Jul. 13, 2020

(86) PCT No.: PCT/EP2020/069714

§ 371 (c)(1),
(2) Date: Jan. 11, 2022

(87) PCT Pub. No.: WO2021/009101

PCT Pub. Date: Jan. 21, 2021

(65) Prior Publication Data

US 2022/0302646 A1 Sep. 22, 2022

(30) Foreign Application Priority Data

Jul. 15, 2019 (DE) ..................... 10 2019 119 145.9

(51) Int. Cl.
*H01R 13/631* (2006.01)
*H01R 13/625* (2006.01)

(52) U.S. Cl.
CPC ......... *H01R 13/631* (2013.01); *H01R 13/625* (2013.01)

(58) Field of Classification Search
CPC . H01R 13/631; H01R 13/625; H01R 13/6456
See application file for complete search history.

(56) References Cited

U.S. PATENT DOCUMENTS

2010/0136808 A1 6/2010 Vanzo
2018/0159275 A1* 6/2018 Mühlfellner ........... H01R 24/38

FOREIGN PATENT DOCUMENTS

DE 32 48 154 C1 4/1984
EP 3 480 902 A1 5/2019
WO WO 2008/117107 A1 10/2008

* cited by examiner

*Primary Examiner* — Michael C Zarroli
(74) *Attorney, Agent, or Firm* — CANTOR COLBURN LLP

(57) ABSTRACT

A coding device for plug connectors that has at least one first coding mechanism and a second coding mechanism assigned to the first, wherein the coding mechanism are each provided on one of the plug connector elements to be connected, wherein the at least one first coding mechanism is rotatably coupled to the plug connector plug, such that the orientation of the plug connector partners relative to one another can be produced via a rotation of at least sections of the coding mechanism relative to the plug connector plug in order to create the plug contact. A plug connector assembly that has a coding device that can be rotated relative to the plug connector.

11 Claims, 4 Drawing Sheets

ROTARY DEVICE FOR PLUG CONNECTORS

RELATED APPLICATIONS

This application is a national stage application of International Application No. PCT/EP2020/069714, filed Jul. 13, 2020, which is related to and claims priority to German Patent Application No. 10 2019 119 145.9 filed Jul. 15, 2019, the entire disclosures of which are hereby incorporated by reference.

BACKGROUND

The invention relates to a coding installation for plug connectors, having at least one first coding means and one second coding means assigned to the first coding means, wherein the coding means are in each case provided on one of the plug connector elements to be plugged. The invention furthermore relates to a plug connector assembly having a coding installation.

Electrical contact elements, contact assemblies, releasable cable connecting elements that are able to be plugged, as well as production methods suitable therefor, are available in the known prior art. Socket or contact elements, or plug connectors, respectively, can be configured in monopolar or multipolar contact assemblies, and have different types of symmetrical or asymmetrical plug patterns, plug faces. These plug connectors in the field of electrical contacting tasks are often implemented as plugs and mating plugs which are able to be released multiple times and are present in various geometric shapes.

The plug contact elements, contact pins, contact blades can have inter alia round, angular, prismatic, symmetrical and asymmetrical cross sections, or be configured in the manner of tongues. The plug connector housings are also of a diverse geometric design: round, elliptic, triangular, quadrangular and polygonal, cascading, modular, etc.

In particular, but not only, in the case of multipolar plug connections embodied as high-current contact elements it can be necessary that the plug connection partners, i.e. the plug and the mating plug, for a mutual contacting must have a defined mutual relative position in order to prevent faulty contacting. Other reasons requiring a predefined mutual relative position may include installation space conditions, spaces for moving and colliding in the environment of the plug connector, cable routings and supply cables to the location of the plug connector, etc.

Coding features are used in order to achieve this defined mutually relative position of the plug connection partners prior to and/or during the plugging process. In this context, coding features are preferably understood to be geometric design embodiments such as, for example, communicating grooves and studs which assist the joining of the plug connector partners only in the correct position/orientation for contacting. Another possibility of coding lies in the asymmetrical plug contact pattern of at least two plug contact elements in the plug contact housing.

In the prior art it is known for plug connectors to be provided with coding means, this often being possible in the form of coding walls, coding protrusions, etc. Coding means having complementary shapes are attached to a corresponding mating part such that electrical contacting is possible only by a mutual engagement of the coding means of the plug connector and the mating part. The purpose of such coding means is to ensure that only the plug connector provided for the respective plug connection is able to be contacted at the latter. Moreover, the correct polarity is also insured by way of such coding means.

DE 10 2017 105 186 A1 shows one possibility for coding, and thus aligning round plug connectors in the correct orientation, in the form of a coding groove. The coding groove on a round plug connector interacts in a corresponding manner with a coding cam on the mating plug and/or the plug connection flange so that an asymmetrical bore pattern, or fastening pattern, respectively, in a geometrically established manner forces the plug connector partners to be joined to one another in the correctly oriented position.

DE 20 2012 008 970 U1 proposes a plug connection which in one potential embodiment has coding that permits the first and the second plug connector to be joined to one another in only one mutual alignment. To this end, the first plug connector of the plug connection can have, for example, a protrusion or a depression in which a complementary depression or a protrusion, respectively, of the mating plug connector engages, wherein this engagement is possible only in one rotational mutual alignment of the two plug connectors. One of the insulating members of the plug that receives the contact elements has a depression in which a complementary protrusion of an insulating member of the coupling part can engage. This results in coding which enables complete joining of the two plug connectors to one another in only one mutual alignment. To the extent that different plug connections are provided in which the protrusion/depression pairings of the plug connectors differ in terms of the cross-sectional geometry and/or in terms of the positioning within the housing of the plug connectors, the coding can additionally be designed such that only functionally matching plug connectors are able to be connected to one another in order for a plug connection to be configured.

A further variant of the coding is disclosed in DE 20 2016 105 525 U1. Described is a plug connector, in particular a direct plug connector, for contacting contact bores of a printed circuit board, having a housing which supports plug contacts having coding pins which interact with coding receptacles on a mating part, in particular with coding receptacles of a printed circuit board. The basic concept of this embodiment is that coding pins are disposed on an external circumferential face as well as in a removable manner on the housing of a plug connector. Individual coding features can be configured in this way.

Different variable coding possibilities are described in DE 20 2018 100 143 U1. The intention is to increase the number of coding possibilities in a simple manner. To this end, coding elements of different shapes, and optionally mating coding elements, which by virtue of the different shaping thereof increase the number of coding settings are used. The coding elements and the mating coding elements in terms of the fastening thereof on the coding element fastening means, or on the mating coding element fastening means, respectively, here are mutually compatible so that uniform plug connectors having defined coding element fastening means and mating plug connectors having uniformly defined mating coding element fastening means can be provided. The coding element and the mating coding element here are in each case separate elements which have not yet been connected to the plug connector, or the mating plug connector, respectively, during production. The connection takes place by the user who also carries out the selection of the coding element and of the mating coding element.

The coding features of plug connections implemented in the prior art define the mutually correct positioning in terms of position and/or orientation by way of the so-called plug face which is defined by the type, the shape, the position and number of the contacting elements and/or of the coding components. In the case of manufactured coding features, the multiplicity of parts thereof, the significant complexity associated therewith in production and assembly, and the susceptibility to errors in the joining thereof are disadvantageous here.

Furthermore, depending on the geometric design embodiment of the coding elements, a faulty plug situation is possible in particular when plug partners with only a conditional compatibility are incorporated in a plug connection situation. This situation is possible in particular when plugs and mating plugs are selected for which pairing is not envisaged. The same applies for the situation in which the contacting elements, in particular having current-conducting properties, are brought in contact before the coding elements engage in one another.

A further issue not solved in the prior art lies in that the plug connection plug partners have to be brought to the plug-compatible orientation thereof by rotating movements relative to one another. This rotational movement in the most unfavorable case may be up to 180°, or a radian Pi, respectively. As a result, the supply lines fixed to the plug connectors are subjected to torsional stress, this potentially leading to permanent torsional stress in the plugged state. The torsional stress is particularly problematic in the case of particularly stiff supply lines and/or ribbon cables, multicore cables.

SUMMARY

It is an object of the invention to at least in part reduce the aforementioned disadvantages and to provide coding for plug connectors that minimizes the rotational relative distance of mutual movement of the plug connectors in order for the plug-in position to be achieved.

For achieving this object, the invention proposes a coding installation which is at least in part independent of the plug face of the plug connection partners in that a movable closure ring having at least one first coding means or mechanism interacts in a coding manner with at least one second coding means or mechanism of a plug connection partner.

At least one second coding means, in which the at least one first coding means coupled to a closure ring as a component part of the closure system can move in and out, is provided on one of the plug connection partners. In one potential specific design embodiment, at least one gate in which the at least one closure stud, closure element, of a closure ring can move is provided on one of the plug connection partners (plug or mating plug, respectively). Furthermore, at least one coding groove is provided at a defined spacing in terms of a radian on the plug connection partner, the respectively assigned closure stud being designed so as to be able to move into said coding groove.

Apart from the at least one closure stud, closure element, at least one coding stud is disposed on the closure ring, said coding stud preferably being disposed on the inside of the closure ring and at an arcuate spacing from the closure stud so as to correspond to the chosen arcuate spacing of the gate and the coding groove of the plug connection partner. Additionally, at least one coding stud is situated on the inside of the closure ring, said coding stud having a defined spacing, or radian, respectively, from the at least one closure element, locking pin.

As a result of this arrangement, the closure ring by way of the at least one assigned locking element, locking pin, thereof can plunge into the gate of the plug connection partner, mating side, only in one defined position. Different coding features can be implemented by varying the arcuate spacings of the closure and coding elements, or the assigned gate and coding groove, respectively.

In order for the electrically conducting connection of the plug connection to be established, the closure ring is rotated until the support housing of the closure ring can be pushed onto the plug connector mating plug thereof and locked thereon. The electrical connection is established only once the closure ring by way of the coding and closure elements can be pushed into the at least one coding groove and gate of the mating plug. As a result, the connection is minimized in terms of torsional stress or free of the latter, because the plug face, if at all, has to be rotated to a minor extent. This means that the closure ring as a component of the closure system is functionally enhanced by the coding function in that, apart from the closure means, coding means are additionally integrated according to the invention.

The coding means described, composed of at least one coding stud and at least one assigned coding groove, are one potential embodiment of the invention but are not limited to an implementation of this type. The invention in practical terms supports any form of coding means in so far as the latter correspond with one another, for example mushroom-shaped studs, spherical caps, prisms, cones or pyramids, etc.

The invention will be explained in more detail hereunder by means of a preferred exemplary embodiment in conjunction with the figures, in which:

DETAILED DESCRIPTION

Figure 1:
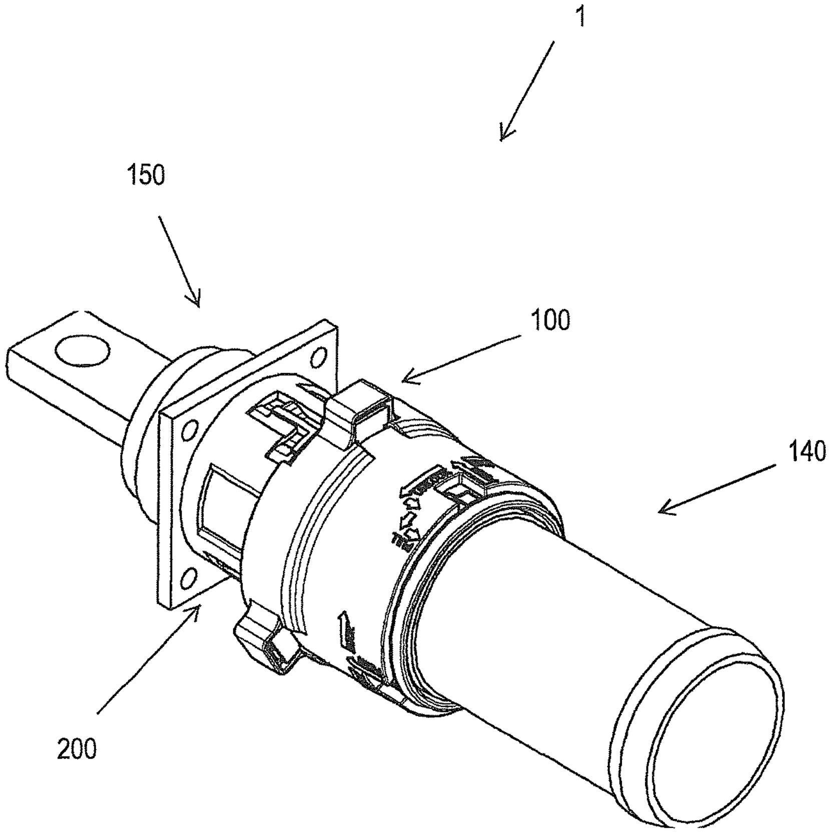
FIG. 1 shows a perspective view of an exemplary embodiment of the coding according to the invention for a plug connector having a closure system.

FIG. 1 illustrates a perspective view of an exemplary embodiment of the coding 200 according to the invention for a plug connector 1 having a closure system 100. The plug connector is preferably but not mandatorily a round plug connector. The core elements include a bayonet ring 110 having a closure ring 119 which is disposed so as to be rotatable on the plug connector housing 140 and has locking components 111, 120, 121, 122 as well as coding components 220.

Figure 2:
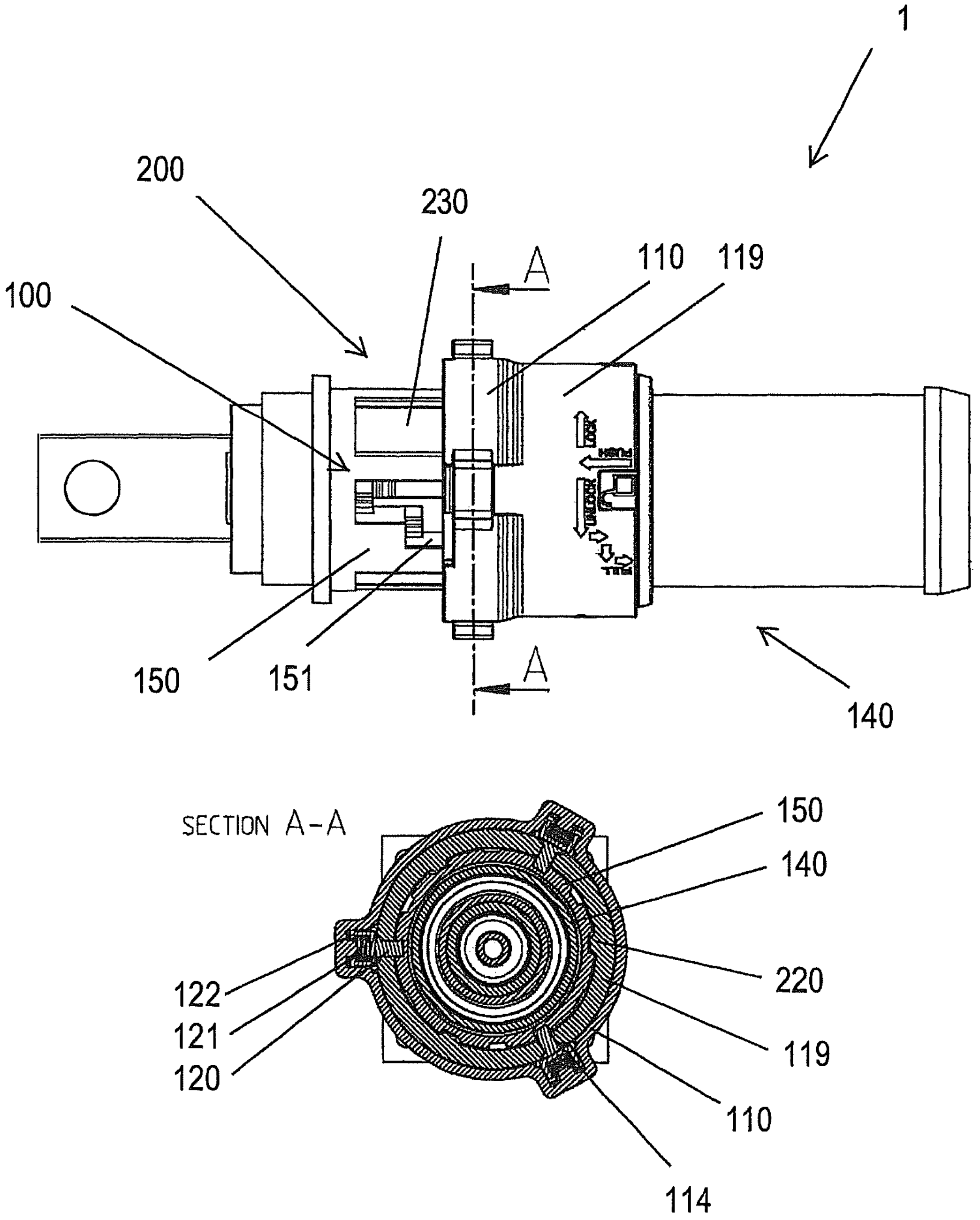
FIG. 2 shows the front view of an exemplary plug connector having a closure system and coding according to the invention in the upper illustration, as well as a sectional illustration in the region of the plug contact zone.

FIG. 2 in the upper illustration shows the front view of an exemplary plug connector 1 having a closure system 100 and coding 200 according to the invention, as well as a sectional illustration in the region of the plug contact zone in the lower illustration.

The bayonet ring 110 together with the closure ring 119 are at least in part rotatable on the plug connector housing 140. The closure ring 119 conjointly with the at least one coding stud 220 thereof is rotated until the latter is axially aligned with the respectively assigned, at least one, coding groove 230 of the plug connector mating plug 150 such that the plug connection can be contacted in that the plug connector partners can be pushed into one another and locked. This means that the locking elements, at least formed by at least one locking pin 120, as well as the coding elements, at least formed by at least one coding stud 220, within the bayonet and closure ring 110, 119 have in each case to be simultaneously aligned with the at least one gate 151 and the coding groove 230 of the plug connector mating plug 150.

Coding variations can be achieved in a simple manner by different spacings of the coding installation 200 and the locking elements 120 on the circumference of the closure ring 119, so that mating plug partner allocations and/or relative mutual coding positions are able to be generated in a wide variation spectrum.

An electrical connection is established only once the closure ring 119 can be pushed onto the plug connector mating plug 150. The plug connection 1 is reduced in terms of torsional stress because the plug face having the lines attached thereto does not have to be rotated in practical terms.

The at least one locking pin 120 is received in a bore 114 of the closure ring 119 so as to be axially movable and functionally interacts with a spring element 121 as well as an optionally assigned sleeve 122 that preferably encases the spring element in regions. The spring element 121 and the sleeve 122 are received in a pocket 111 of a bayonet ring 110 that externally encompasses the closure ring 119 and, in a bayonet ring orientation that corresponds to the opened position, so as to bear on the external end side of the locking pin 120. The locking pin 120 in this bayonet ring orientation is movable radially in relation to the plug connector housing 140 and counter to the spring force of the spring element 121 such that the locking pin 120 in terms of the kinematics of the movement thereof can compensate for dissimilar depth levels of the gate, the bayonet groove 151. The bayonet ring 110 in the unlocked position (shown here), as a result of the degree of freedom of the locking pin 120 present in this instance, facilitates the movement of the locking pin 120 through the gate 151 in a manner independent of the height level in said gate 151.

A symmetrical arrangement of three locking pins 120 on the circumference of the plug connector housing 140, or so as to be uniformly distributed on the circumference, respectively, is shown in FIG. 2. This design which is often advantageous for reasons of statics can also be constructed in a variable manner, depending on the field of application or the environmental conditions, for example so as to be asymmetrical or with one, two or more than three functionally interacting locking pin arrangements. The same applies to the coding installation 200, or the coding stud 220 on the closure ring 119, respectively.

Figure 3:
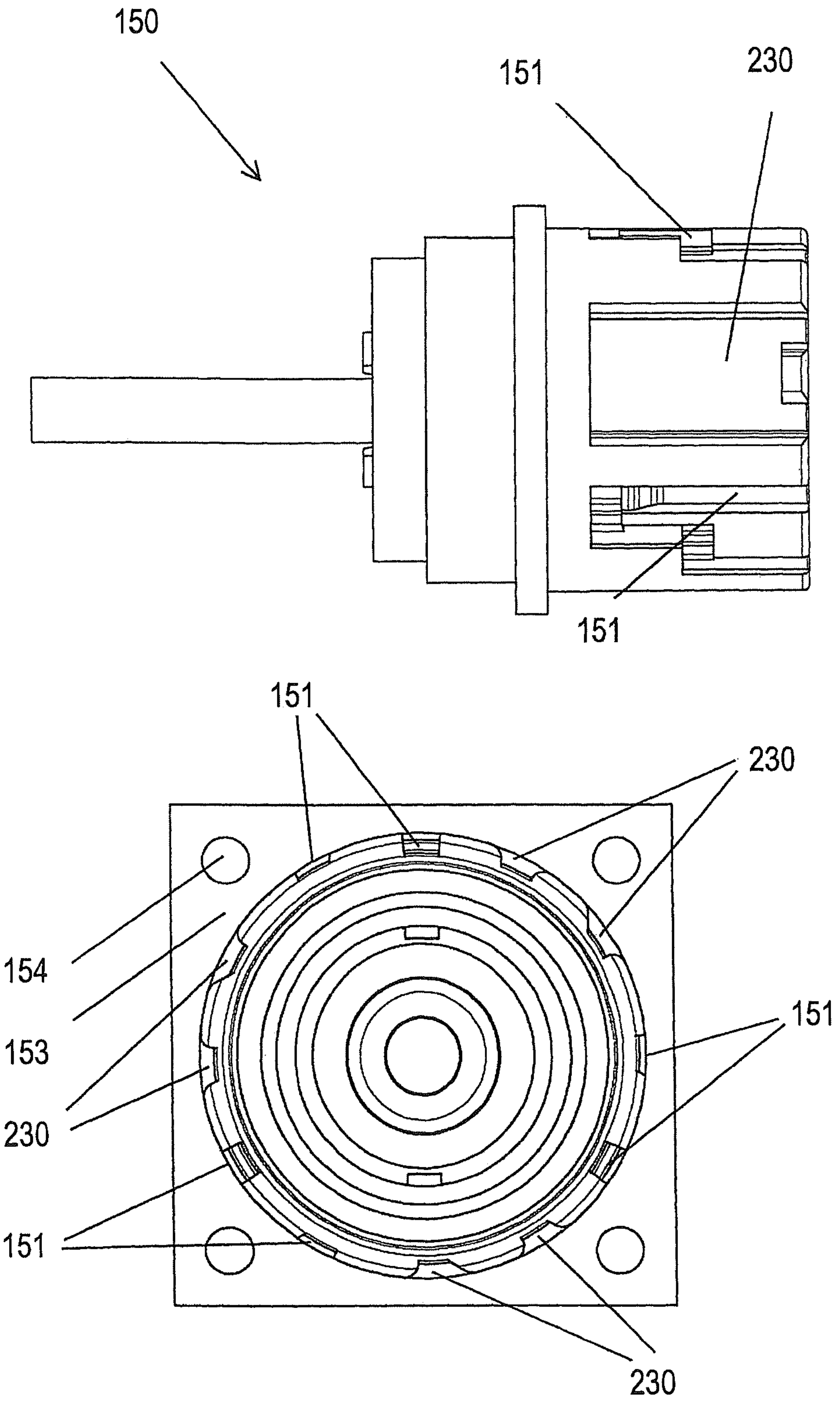
FIG. 3 shows the front view in the upper illustration, and in the lower illustration shows the right-hand view of an exemplary plug connector mating plug.

FIG. 3 in the upper illustration shows the front view and in the lower illustration shows the right-hand view of an exemplary plug connector mating plug 150. At least one gate 151 having in each case one end-side entry opening and one exit opening is incorporated in the plug connector mating plug 150 on the external circumference of the latter. The gate 151 in terms of the profile thereof between the entry opening and the exit opening is Z-shaped and embodied having mutually dissimilar depth extents in the radial direction, said depth extents transitioning into one another by way of ramp-shaped portions.

The at least one coding groove 230 of the coding installation 200 is incorporated on the external circumference of the plug connector mating plug 150 so as to have a defined arcuate spacing relative to the at least one gate 151. The exemplary embodiment shown in a symmetrical arrangement on the circumference comprises three coding groove 230 and three gates 151. The respective mutual arcuate spacing of the coding groove 230 and the gate 151 is adapted to the respective arcuate spacing of the at least one coding stud 220 and of the at least one locking pin 120, or the bore for the locking pin 114 in the closure ring 119 of the plug connector plug 140 to be assigned thereto, respectively.

Coding variations can be achieved in a simple manner by different arcuate spacings on the circumference of the closure ring 119 and assigned thereto on the plug connector mating plug 150, such that plug partner allocations and/or relative mutual coding positions are able to be generated in a wide variation spectrum.

The coding groove 230 on the circumference of the cylindrical portion of the plug connector mating plug 150 is configured so as to be U-shaped having in each case one end-side entry opening and one exit opening.

The coding groove 230 is preferably provided, and illustrated in FIG. 3, so as to be implemented with an inconsistent groove width. The guiding of the coding stud 220 in the movement profile within the coding groove 230 is of secondary importance in terms of the coding task such that a suitable width of the guiding groove is not required. Rather, the following is important:

- that the contours of the coding stud 220 and of the coding groove 230 are mutually adapted with a view to pairing their movements;
- that the same applies to the tolerances to be chosen with a view to play in the movement;
- that the width of the coding groove in the U-shaped portion is configured for providing the degree of freedom of movement for the necessary kinematics in terms of the movement of the closure system 100;
- the defined, mutually aligned circumferential position.

The coding groove 230 is configured so as to be U-shaped in a manner adapted to the gate 151 so as to assist the rotational as well as axial-linear degree of freedom of movement of the at least one locking pin 120 in the Z-shaped gate 151. For this purpose, the respective circumferential spacings of the end-side entry opening and exit opening of the coding groove 230 and the gate 151 are mutually adapted.

Figure 4:
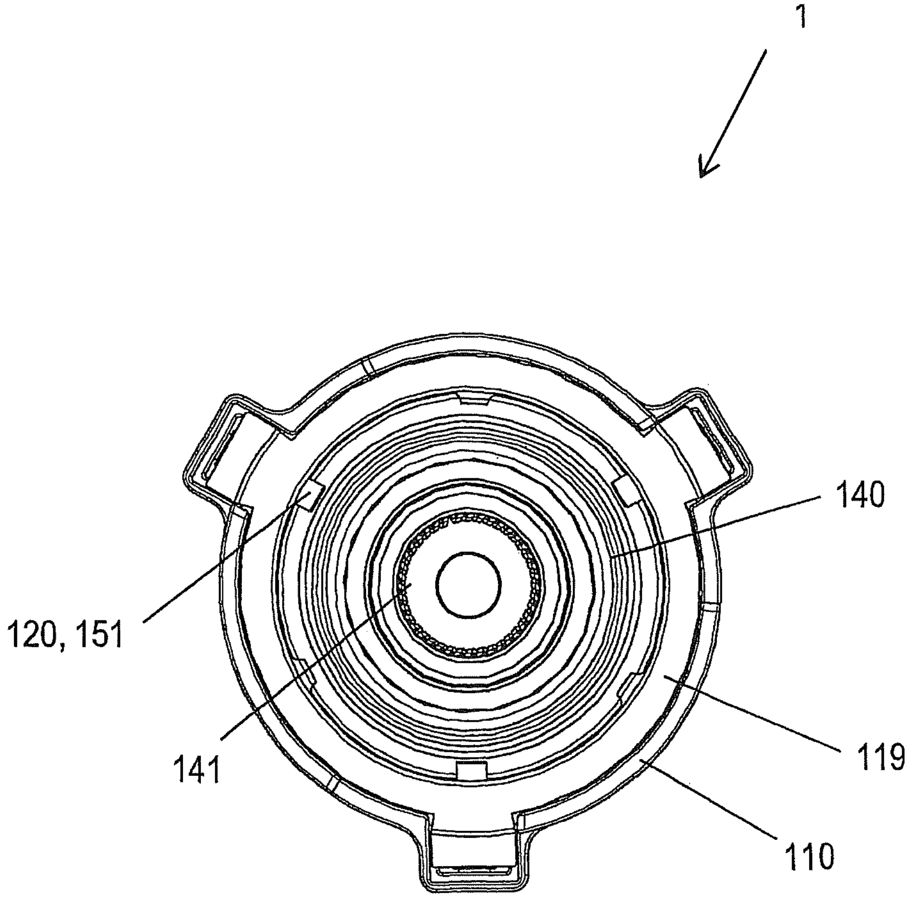
FIG. 4 shows the left-hand view of an exemplary plug connector from FIG. 1 and FIG. 2.

FIG. 4 illustrates the left-hand view of an exemplary plug connector 1 from FIG. 1 and FIG. 2. The electrically conducting contact in the example shown is implemented by a round contact in the form of a lamella contact socket 141 into which a suitably shaped plug contact blade is incorporated. The plug connection 1 can be embodied as a high-voltage or high-tension plug connection.

LIST OF REFERENCE SIGNS

1 Plug connector, plug connection
100 Closure system for plug connectors
110 Bayonet ring
111 Pocket
114 Bore (for locking pin)
119 Closure ring
120 Locking element, locking pin
121 Spring element
122 Sleeve
140 Plug connector, plug connector housing, plug connector plug
141 Contact, annular contact, lamella contact socket
150 Base, base mating plug, plug connector mating plug
151 Gate, bayonet gate, bayonet groove, control gate

153 Base plate, flanged plate
154 Bore
200 Coding for plug connector, coding installation
220 First coding means, coding stud
230 Second coding means, coding groove

The invention claimed is:

1. A coding installation assembly for establishing a plug connection, the coding installation assembly comprising:

a plug connector and a mating plug connector configured to be inserted into the plug connector;

at least one first coding mechanism and one second coding mechanism compatible with the first coding mechanism, wherein the first coding mechanism is coupled to an inner surface of the plug assembly, and the second coding mechanism is coupled to an outer surface of the mating plug connector, wherein the at least one first coding mechanism is coupled so as to be rotatable in relation to the plug connector such that a mutual orientation of the plug connector and the mating plug connector for establishing a plug-connection contact, is able to be established by rotating the first coding mechanism at least in portions relative to the plug connector.

2. The coding installation assembly as claimed in claim 1, wherein the coding installation assembly is disposed outside a plug face of each of the plug connector and the mating plug connector.

3. The coding installation assembly for as claimed in claim 1, wherein the at least one first coding mechanism is established on a closure ring of a closure system that is rotatably coupled to a plug connector.

4. The coding installation assembly for as claimed in claim 3, wherein the at least one first coding mechanism, for implementing a primary locking action of the plug connection contact, is disposed at a defined arcuate spacing from at least one locking element coupled to the closure ring of the closure system.

5. The coding installation assembly for as claimed in claim 3, wherein the at least one first coding mechanism is coupled to the inside of the closure ring and extends radially inward.

6. The coding installation assembly for plug as claimed in claim 3, wherein a plurality of the first coding mechanisms are coupled symmetrically or asymmetrically to the closure ring.

7. The coding installation assembly for as claimed in claim 3, wherein the coding mechanism is formed by at least one first coding stud coupled to the closure ring, and at least one first coding groove assigned to the coding stud and coupled to the plug connector mating plug.

8. The coding installation assembly for as claimed in claim 7, wherein the at least one coding groove is configured with a U-shape to assist the kinematics of the closure system by guiding the movement of the closure ring and ensuring proper alignment and engagement of the at least one locking element.

9. The coding installation assembly for as claimed in claim 7, wherein the at least one coding groove has at least two mutually different groove widths configured to facilitate the kinematics of the closure system by guiding the movement of the closure ring and ensuring the proper alignment and engagement of the at least one locking element.

10. The coding installation assembly for as claimed in claim 7, wherein the at least one coding groove has an entry opening on one end and an exit opening the other end configured to assist the kinematics of the closure system by guiding the movement of the closure ring to ensure the proper alignment and engagement of the at least one locking element.

11. A plug connection including a plug connector having a closure system, a mating plug connector mating plug, and a coding installation assembly, wherein the coding installation assembly is configured as claimed in claim 1, such that a mutual orientation between the plug connector and the mating plug connector establishes the plug-connection contact and is configured to be established by rotating the at least one first coding mechanism at least in portions relative to the plug connector.

* * * * *